Nov. 14, 1967     C. R. HILPERT     3,352,395
FRICTION CLUTCH HAVING CENTRIFUGALLY OPERATED VALVE MEANS
Filed Feb. 18, 1966     11 Sheets-Sheet 4

INVENTOR
CONRAD R. HILPERT
BY
*James E. Nilles*
ATTORNEY

Nov. 14, 1967  C. R. HILPERT  3,352,395
FRICTION CLUTCH HAVING CENTRIFUGALLY OPERATED VALVE MEANS
Filed Feb. 18, 1966  11 Sheets-Sheet 5

INVENTOR
CONRAD R. HILPERT
BY James E. Nilles
ATTORNEY

INVENTOR
CONRAD R. HILPERT
BY James E. Nilles
ATTORNEY

Nov. 14, 1967     C. R. HILPERT     3,352,395
FRICTION CLUTCH HAVING CENTRIFUGALLY OPERATED VALVE MEANS
Filed Feb. 18, 1966     11 Sheets-Sheet 9

INVENTOR
CONRAD R. HILPERT
BY
James E. Nilles
ATTORNEY

INVENTOR
CONRAD R. HILPERT
BY
James E. Nilles
ATTORNEY

Nov. 14, 1967  C. R. HILPERT  3,352,395
FRICTION CLUTCH HAVING CENTRIFUGALLY OPERATED VALVE MEANS
Filed Feb. 18, 1966  11 Sheets-Sheet 11

Fig. 20.

INVENTOR
CONRAD R. HILPERT
BY
James E. Nilles
ATTORNEY

United States Patent Office 3,352,395
Patented Nov. 14, 1967

3,352,395
FRICTION CLUTCH HAVING CENTRIFUGALLY OPERATED VALVE MEANS
Conrad R. Hilpert, Winnebago, Ill., assignor to Twin Disc Clutch Company, Racine, Wis., a corporation of Wisconsin
Filed Feb. 18, 1966, Ser. No. 528,422
7 Claims. (Cl. 192—103)

This invention relates generally to centrifugally controlled friction type clutches.

The torque transmitting ability of any given friction clutch will vary considerably when in use, and this variation is due to several things, one of which is the fact that the coefficient of friction in any given clutch changes rapidly during its use. Because of this, the manual control in some clutches is very difficult, particularly if such clutch is used to feed into a torque converter, resulting in considerable instability of the power drive.

It is therefore, a general object of the invention to provide a centrifugally controlled, friction type clutch, for controlling the speed of either the input or output member of the clutch, independently of variations in the coefficient of friction in the clutch itself. With the present invention, it is possible to eliminate the conventional balance pistons of conventional clutches.

An object of the present invention is to provide a centrifugally controlled friction clutch having means, including a centrifugally operated valve, for providing a continuously slipping condition in the friction clutch, whereby the rotatable speed of that member of the clutch in which the centrifugally operated valve is located can be controlled or held constant and is directly related to an externally applied control pressure and regardless of variations in coefficient of the friction of the clutch or variations of load upon one of the members of the clutch. The centrifugally operated valve controls the speed of the rotatable member in which it is located and this is done by controlling the clutch apply pressure so that the speed of that member is regulated by varying the slipping of the clutch.

Another object of the invention is to provide a method of controlling a clutch of the above type.

The invention contemplates the use of only a single control pressure for controlling the centrifugal valve as well as using it as the actual force for causing slipping engagement of the clutch.

In addition, the invention also contemplates the use of a separate source of "apply" pressure for actuating the clutch, which apply pressure is completely independent of the control pressure which is used for actuating the control valve; in other words, in some instances it may be desired to have a higher and/or independent apply pressure than that provided simply by the control pressure, in order to provide better control of the unit, for example, by eliminating piston inertia shift problems.

The invention also contemplates a centrifugal control valve device of the above type in which the centrifugal valve is located on the output member of the mechanism to provide a constant output speed thereof. As an alternative, the control valve may be located on the input member and provides for unloading or varying the apply pressure on the clutch whereby the clutch slips and thus unloads the output member thereby also maintaining constant speed of the input member.

In regard to the arrangement of the control valve itself, the valve can be made to control the input to the clutch actuating piston chamber. Alternatively the control valve can be made as an "inversion," that is to say, continuous pressure is admitted to the clutch piston actuating chamber and the centrifugal valve then controls the outflow from the piston actuating chamber. In either event the control clutch mechanism controls the apply pressure on the clutch piston which in turn actuates the friction clutch for slipping engagement thereof.

Another more specific object of the invention is the provision of compensating pins located at the radially inner end of the centrifugally operated control valve, and which pins compensate for the change of centrifugal force acting on the control valve due to the change of radial location of the control valve.

These and other objects of the present invention will appear hereinafter as this disclosure progresses, reference being had to the following drawings, in which:

FIGURE 1 is a longitudinal, cross sectional view of a clutch mechanism embodying the present invention, certain parts being broken away for clarity;

FIGURE 1a is an enlarged, fragmentary view of a portion of the mechanism shown in FIGURE 1;

FIGURE 1b is a sectional view taken along line 1b—1b in FIGURE 1a;

In the devices shown in FIGURES 2 to 7, the member B is the power input member and the member A is the power output member, the centrifugal valve being located on the output member A.

In FIGURES 10 through 19, the member A is the driving or power input member, while member B is the output member, the centrifugal valve being located in the input member A.

FIGURE 19 is a view similar to FIGURE 16 but being a modification thereof;

Figures 1, 1A, 1B:
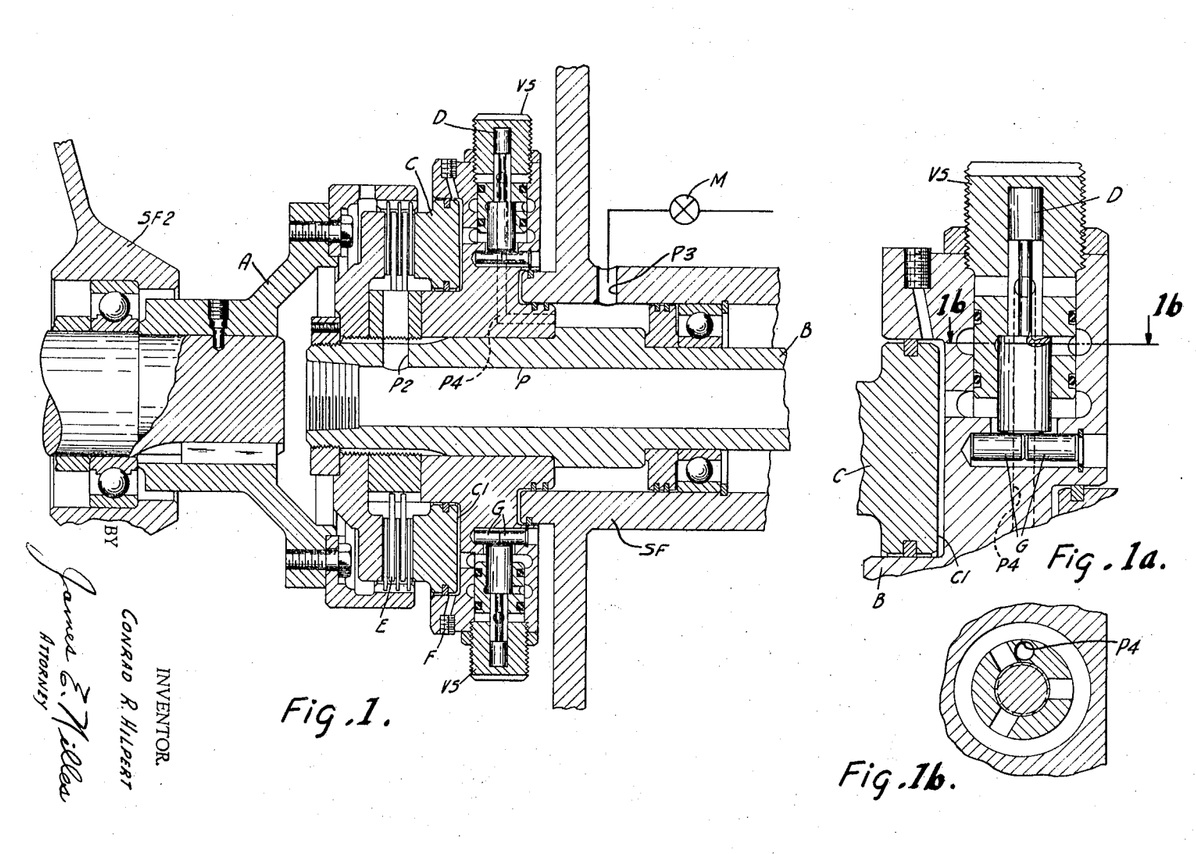

It is not believed necessary to illustrate the manner in which the parts are actually constructed for manufacture and assembly purposes, but instead schematic views have been used to clarify the description and as an aid in understanding the invention. FIGURE 1, however, shows an example of how these parts could be made if desired. The centrifugally actuated valve to be described in various modifications hereinafter, is carried by the rotatable member whose speed it is desired to control. The hydraulically operated piston for causing slipping engagement of the friction plates can be carried on either the input or output member of the clutch actuating piston could be carried on the same member or alternatively, the valve carried on one member and the piston carried on the other, the latter being referred to hereinafter as a divided or split design.

Reference will also be made to certain compensating pins and also to a "tail" feature for the centrifugal valve, and some of the drawings will illustrate these two features, it being remembered that they could also be used in other of the modifications, although they may not be specifically shown or described there.

FIGURE 1

FIGURE 1 is used to illustrate the conventional details of parts which may be used in the other figures and includes the stationary frame SF in which one of the rotatable members, for example say the output member B, is journalled on the conventional anti-friction bearings. The input member A is also journalled on conventional anti-friction bearings on another frame SF2. The centrifugally operated control valves D are shown here as being two in number, but it should be understood that one or more of these valves can be used as necessary or desired in the clutch mechanism forming the subject matter of this invention. These valves are slidable in their sleeves VS which in turn may be threadably engaged in that rotatable member which is desired to be controlled as to speed.

As will more fully appear, compensating pins G may be provided for the valve, and a bleed orifice F also provided.

The clutch actuating piston C is slidable in the clutch actuating chamber C1, and interleaved friction plate E provide a slippable connection between the input and output members, some of these plates being axially splined to each of these members.

Cooling fluid may be introduced in any conventional manner to the plates E, such as, passage P in member B and then through the cross ports P2.

Reference will now be made to several schematic diagrams in which various modifications of this invention will be illustrated and described.

In the embodiments of the invention shown in FIGURES 2 to 7, the member B is the driving or power input member which would be connected to a source of power, such as an engine. Member A is the output or driven member. In these views the centrifugal valve is located in the output member A, which is the member whose speed it is desired to control or maintain constant.

As shown in FIGURE 1, control pressure is supplied from a pressure fluid source (not shown), through fluid pressure control means M and then via conventional passage means P3, P4, as shown, to the valve D.

Figures 2, 2A, 2B:
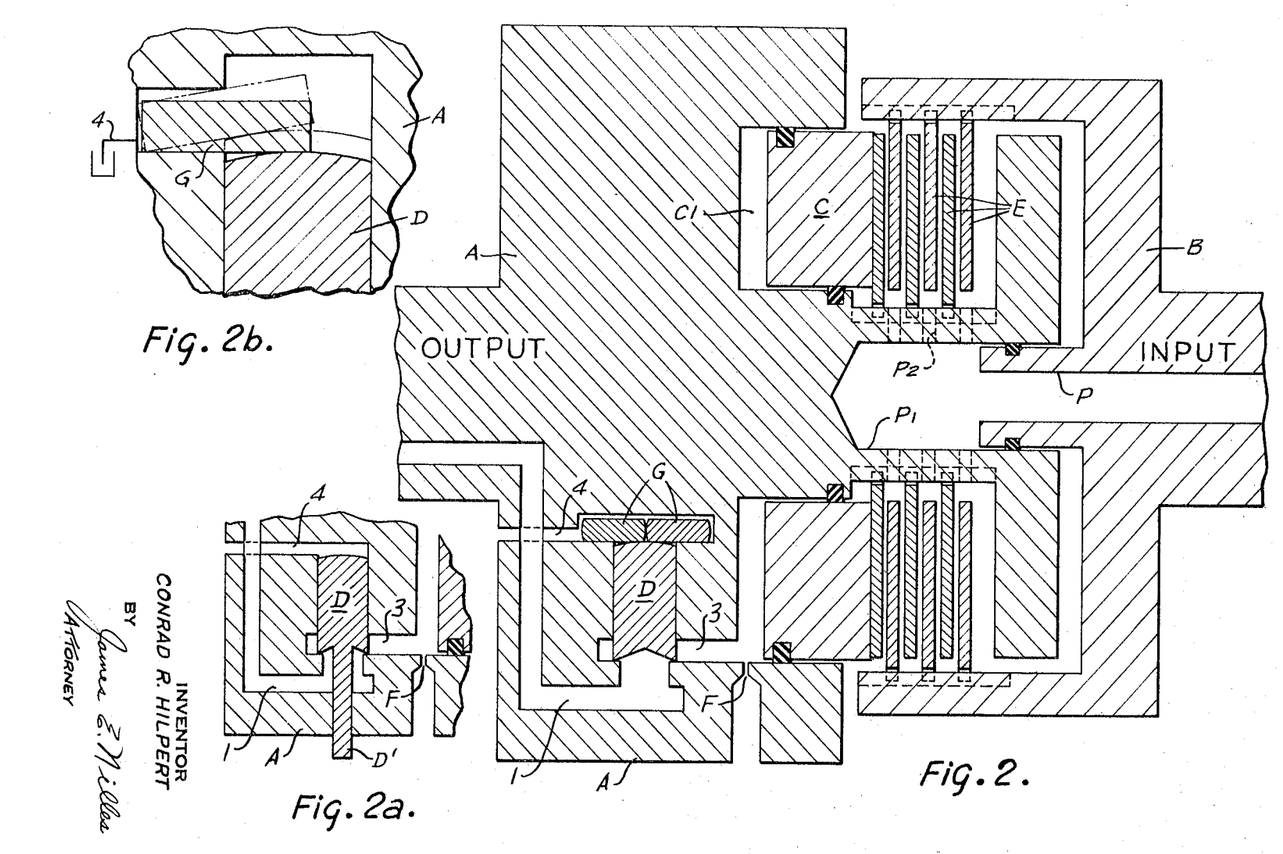
FIGURE 2 is a schematic, longitudinal, cross sectional view of a clutch mechanism embodying the present invention.
FIGURE 2a is a fragmentary view of a modification of the valve shown in FIGURE 2, on a slightly reduced scale.
FIGURE 2b is an enlarged, fragmentary view of a modification of the compensating pin arrangement shown in FIGURE 2.

FIGURE 2

Referring in greater detail to FIGURE 2, a rotatable output member A has a hydraulically actuated piston C slidable therein and rotatable input member B is piloted on member A. Interleaved friction plates E are located between members A and B, some being splined to member A and others to member B for axial shifting to form a slippable driving connection between the members when the piston C is urged toward the right, as viewed in the drawings.

Cooling fluid may be supplied through passages P, P1 and P2 in the known manner, through either or both of the members, to the plates E.

A centrifugally actuated valve D is radially slidable in a bore in the member A to be controlled and a fluid passage 1 provides clutch control fluid pressure to the radially outer end of the valve D. When the valve D is in the position shown in FIGURE 1, its outer end plugs the passage 3 which would otherwise communicate with the piston chamber C1. If the control pressure in passage 1 is great enough, the valve D will be urged radially inwardly to uncover passage 3 and permit pressure fluid to enter chamber C1, thus urging the piston to the right towards the clutch engaging position.

A bleed orifice F bleeds the piston chamber C1 at all times, thus causing a release of the clutch if the pressure fluid supply is shut off.

In connection with the orifice F, it must be capable of bleeding off pressure fluid faster than the coefficient of friction can build up, in order to provide proper control by immediately reducing pressure in chamber C1 and preventing a time lag by the valve in controlling the clutch.

When the clutch is rotating, the radially shiftable valve D progressively shuts down the control fluid pressure as the centrifugal force acting on the valve approaches that of the control fluid pressure. In this manner the clutch output is limited to the speed at which the control fluid pressure is equal to the centrifugal force acting on the valve D. The only effect for a change in the coefficient of the friction of the clutch will have is to change the pressure of the fluid in chamber C1 acting on the piston C.

Compensating pins

Means may be provided, under certain circumstances where necessary, for compensating for the change of centrifugal force acting on the valve D due to the change in radial position of the valve. This compensating means takes the form of a pair of pins G located in the carrier and at the raidally inner end of the valve D. The compensating pins may be vented by passage 4 so that fluid pressure which leaks past the valve D can escape thereby preventing malfunction of the pins.

More specifically, here is an inherent instability in such a clutch due to the formula $F=MR\omega^2$ where $\omega$ is the rotational velocity and R is the radius and M is the mass. The force is thus a direct function of R and therefore, as the valve D moves toward the center line it requires less force to shift it. However, here still remains the same amount of fluid pressure available and thus the valve would, under some circumstances, move in an uncontrollable fashion. The pins G compensating for this change of force required due to the change of the value of R.

A modified form of compensating pin, using a single pin, is shown in FIGURE 2b.

Thus the compensating pins or pin prevent the valve D from great movements, acting to clamp its movement, and enhancing the valve to become centrifugally stable through its permitted range of movement. The inner end of the valve D is crowned so that when on the valve seat, the centrifugal force of the pin or pins is divided between the carrier and the valve. The centrifugal force of the pin is totally supported by the valve when the latter is at its radially inner limit. The weight of the pin need be only approximately ten percent of the valve weight in order to stabilize the latter.

In the FIGURE 2 arrangement, the pressure available to engage the clutch must be greater than the supply pressure because of centrifugal force. In some installations where smooth clutch engaging action is required, a considerable portion of the force for applying clutching effect may come from centrifugal head pressure, thereby a sudden, full application of pressure by the operator will not produce erratic or jerky action. The sudden requirement for some finite r.p.m. will only permit acceleration by a torque considerably less than the maximum clutch torque.

FIGURE 2a shows a modification of the valve D which has a "tail" D1 that reduces the effective area on which the fluid pressure can act and permits the use of a lighter valve for any given condition.

Thus in FIGURE 2, the output member will run at a predetermined, constant speed regardless of its load and as determined by the pressure in passage 1.

Generally, in respect to the drawings, it is not believed necessary in each instance to illustrate the fluid passages, P, P1 and P2 for the cooling fluid for the clutch plates, nor passage 1 for control pressure. It is understood that this is conventional and can be accomplished in several ways as desired.

Figure 3:
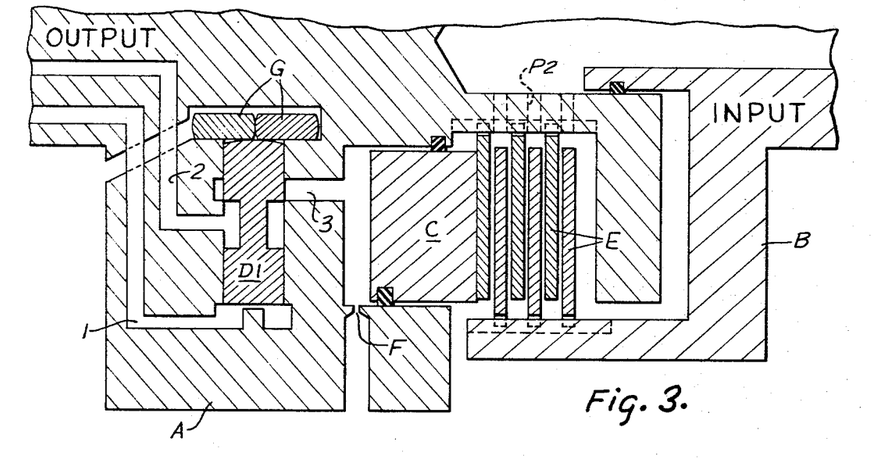
FIGURE 3 is a fragmentary, longitudinal, cross sectional view of the clutch mechanism embodying the present invention, being a modification of the device shown in FIGURE 2.

FIGURE 3

In many load situations the torque must be independent of speed, that is the load torque requirements will not follow a "square law." The arrangement shown in FIGURE 3 is designed to accommodate such requirements by having the control pressure in passage 1 in opposition to the centrifugal force of valve D1, and a separate source of fluid pressure in passage 2, called the "apply" pressure, is used to actuate the clutch piston C. Consequently, the valve movement controls the clutch apply pressure which is provided from a constant source, independently from the "control" pressure in passage 1.

Figure 4:
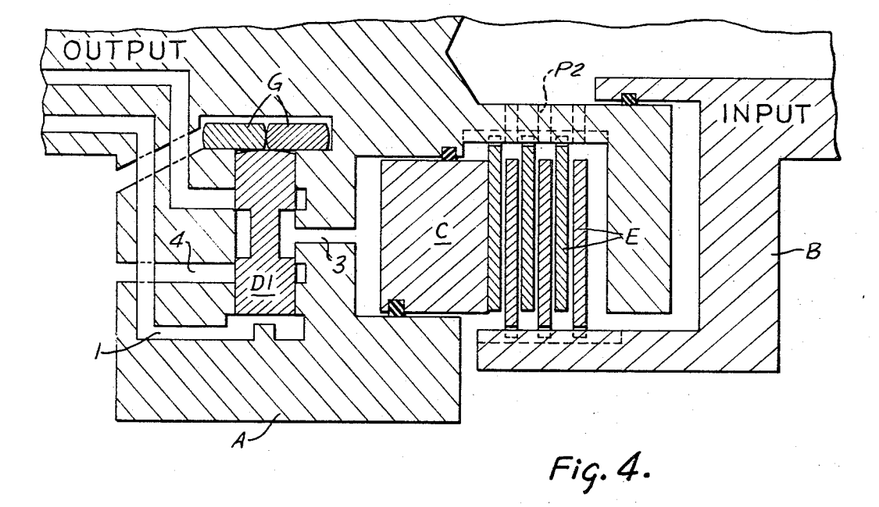
FIGURE 4 is a view similar to FIGURE 3 but showing a modification thereof.

FIGURE 4

This is a modification of the arrangement shown in FIGURE 3 but the spool valve D vents pressure from chamber C1 to sump passage 4 when the valve moves radially outward. Therefore the vent 4 in FIGURE 4 replaces the orifice F of FIGURE 3. Inward movement of valve D permits apply pressure to go from passage 2 to chamber C1.

Figure 5:
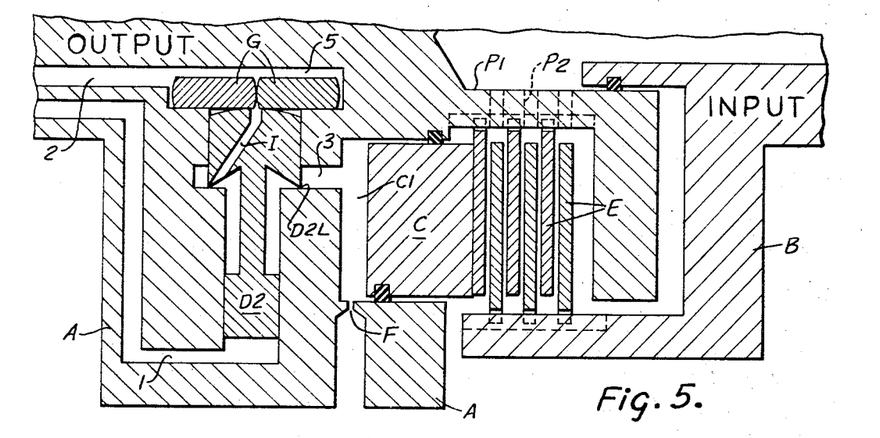
FIGURE 5 is a view similar to FIGURE 3 but showing a modification thereof.

FIGURE 5

Figure 9:
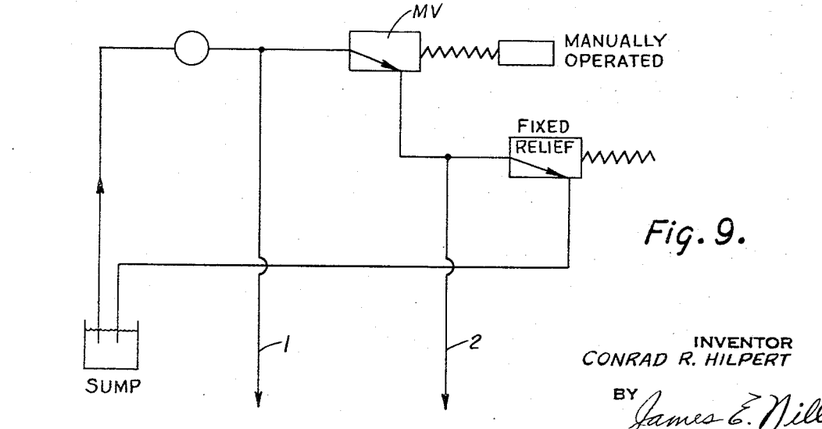

The arrangement shown in FIGURE 5, and its hydraulic control circuits as shown in FIGURE 9, are used to overcome certain control problems which may occur under some conditions with the device of FIGURE 3. For example, in the device of FIGURE 3, valve port overlapping or underlapping may occur to cause a dead space and resulting control problems. The valve arrangement of FIGURE 5 overcomes this difficulty.

Referring also to FIGURE 9, if the manual control valve MV is not activated, the valve D2 will be in the position shown with its land portion D2L blocking passage 3, and the pressure in passages 1 and 2 will be equal. The pressure in the compensating pin chamber 5, because of a passage I in valve D2, will be equal to that in passage 2. Furthermore, the pressures in chamber C1 and at the discharge side of orifice F will also be equal.

Due to centrifugal force, valve D2 will thus close flow from passage 2 to passage 3 leading to the chamber C1, creating a neutral situation, that is, the valve D2 will be in hydrostatic force balance. Chamber C1 will be emptied through orifice F.

Figure 5A:
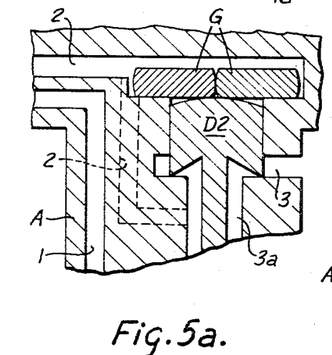
FIGURE 5a is a fragmentary, detailed view of a portion of the device shown in FIGURE 5 and showing a modification thereof.

As an alternative to the use of passage I in the valve D2, passage 2, as shown by dotted lines in FIGURE 5a, may lead directly to the space 3a between the lands D2L and D21 of the valve. When the manual valve MV is shifted, pressure in passage 1 is raised over that of passage 2, thus overcoming centrifugal force on valve D2, allowing pressure fluid from passage 2 to cause clutch engagement. Engagement of the clutch and consequent increase in speed causes increase in the centrifugal force acting on valve D2, and restricts pressure fluid flow from passage 2 to passage 3, thus limiting speed of rotation.

The "apply" pressure can thus be made to be of any desired value.

With the FIGURE 5 device, therefore, higher "apply" pressure (via passage 2) is possible than the pressure of the control fluid in passage 1, in FIGURES 1 thru 4 for example. Good control is obtained by eliminating the valve inertia shift problem, that is to say, preventing the valve from going "beyond" the closed position.

Figure 6:
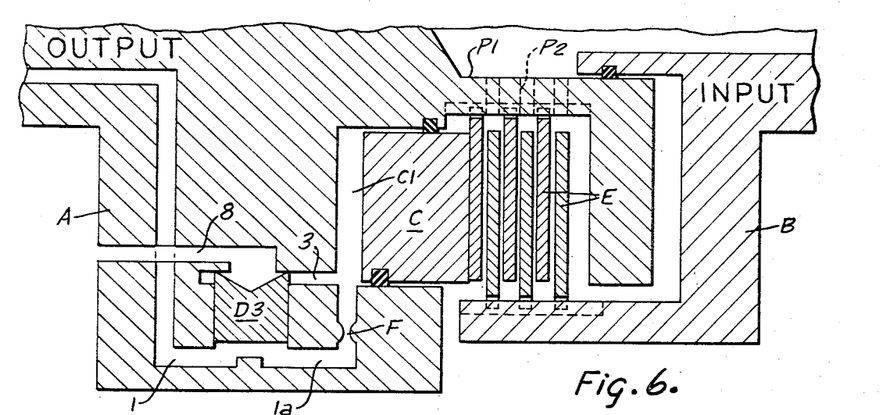
FIGURE 6 is a view similar to FIGURE 2 but being an "inversion" thereof.

FIGURE 6

The device shown in FIGURE 6 may be termed an "inversion" of the FIGURE 2 arrangement, in that the control fluid enters via passages 1 and 1a and is fed continuously to chamber C1 via orifice F, thereby applying the clutch. However, if the centrifugal force of valve D3 exceeds the force on it from passage 1, the fluid pressure from passage 3 will be vented through passages 3 and 8 as the valve moves radially outward. Here again, then, for each pressure in passage 1, a "balancing" speed of the output member B will be reached.

With this arrangement, it is the outflow from the chamber C1 which is controlled by the centrifugal valve D3, and the slip in the friction clutch is continuously and completely controlled.

Figure 6A:
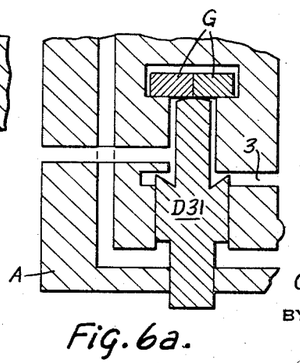
FIGURE 6a is a fragmentary view showing an alternate form of the valve arrangement in FIGURE 6.

FIGURE 6a shows a modification of FIGURE 6 wherein the valve D31 has a "tail" for reducing the effective area of the valve on which pressure in passage 1 is operative. The compensating pins G have also been included.

Figure 7:
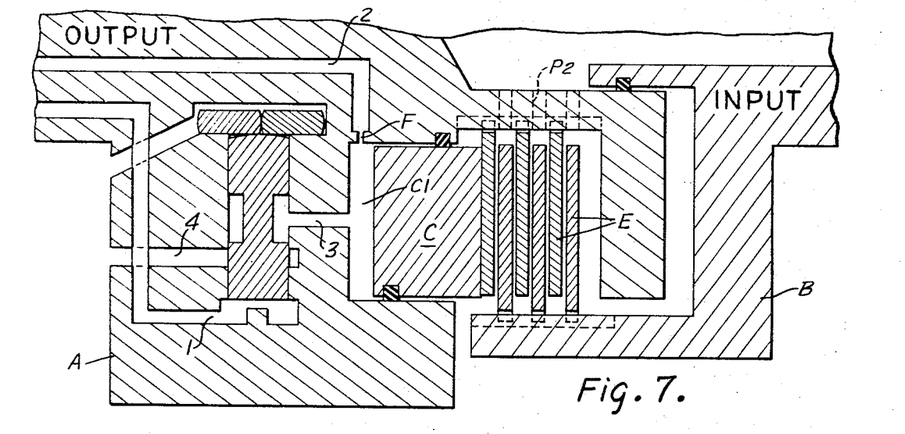
FIGURE 7 is a view similar to FIGURE 3 but is an "inversion" of the device shown in that figure.

FIGURE 7

FIGURE 7 is an inversion of the FIGURE 3 arrangement in that the apply pressure passage 2 continuously feeds fluid through orifice F to the chamber C1. If the clutch speed is sufficient to shift valve D4 radially outward, overcoming the control pressure in passage 1, then pressure fluid is vented via passages 3 and 4. When the speed decreases sufficiently, valve D4 moves inward restricting flow in passage 3 and out of chamber C1, thereby permitting fluid flow through orifice F to raise pressure in chamber C1 and increasing clutch engagement.

FIGURES 10–19

In the embodiments of the invention shown in FIGURES 10 through 19, the member A is the driving or power input member for the clutch mechanism and could be connected to a source of power, such as on an engine or the like (not shown). Member B is the driven or output member which would be connected to the load (not shown). Here the centrifugal valve is located in the input member A, which is the member whose speed it is desired to control or maintain constant.

Figure 10:
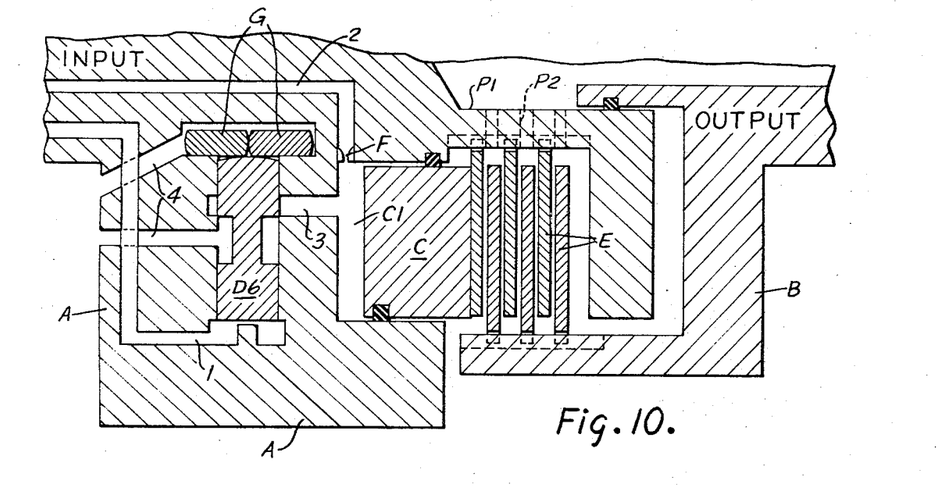
FIGURE 10 is a modification of the FIGURE 3 device.

FIGURE 10

In the embodiment shown in FIGURE 10, the centrifugal valve D6 limits the minimum speed to which the member A can drop due to excessive loading on the driven member B. Two vent passages 4 are provided. Here the apply pressure in passage 2 continuously feeds through orifice F to the chamber C1. This figure is a modification of FIGURE 3 and allows the clutch to be increasingly engaged as the speed causes the valve D6 to move radially outward, closing passage 3, against the control pressure in passage 1.

Figure 11:
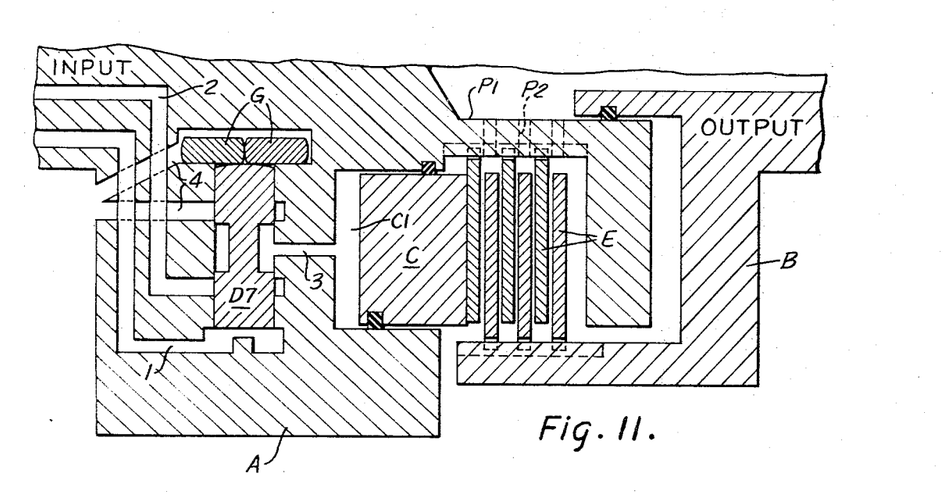
FIGURE 11 is a modification of the FIGURE 4 device.

FIGURE 11

This is a modification of FIGURE 4 whereby as valve D7 moves outward against control pressure in passage 1, the clutch is increasingly engaged. Two vent passages 4 are provided. Here the member A, containing the centrifugal valve, is maintained at constant speed because as it tends to increase its speed, the clutch is engaged to a greater degree, thus slowing member A down due to the load on output member B.

Figure 12:
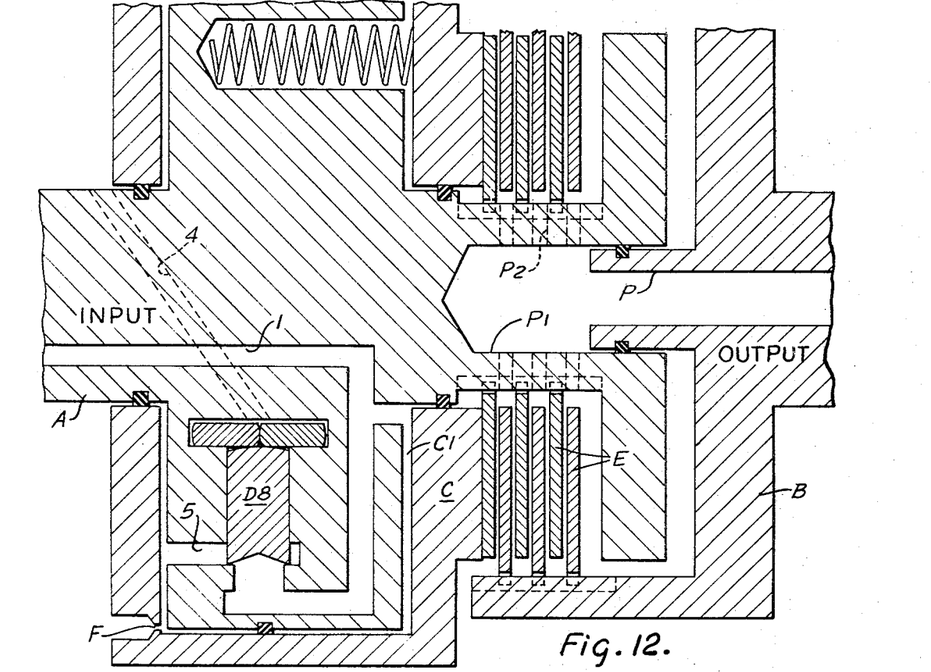
FIGURE 12 is a modification of the FIGURE 2 device.

FIGURE 12

The device of FIGURE 12 is a modification of FIGURE 2 and provides for controlled pressure release at 5 for the double ended, U-shaped piston C. When the valve D8 is in the inner position, the control pressure in passage 1 and in chamber 5 opposes the control pressure acting in chamber C1.

As the speed increases, the outer movement of valve D8 reduces pressure at 5, thus allowing control pressure in chamber C1 to engage the clutch more. Thereby the loads on member B are prevented from reducing the speed of input member A below that determined by the control pressure 1 and the weight of valve D8.

Figure 13:
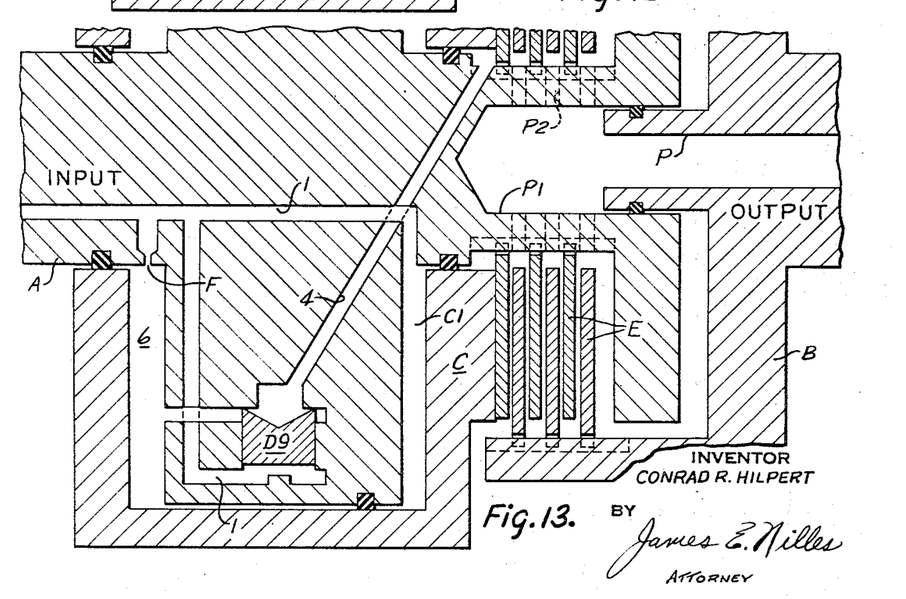
FIGURE 13 is a longitudinal, cross sectional view in the schematic form showing still another modification of the invention.

FIGURE 13

FIGURE 13 shows a device in which a reduction in speed of the input member A will cause a release of the clutch because valve D9 will move radially inwardly causing the flow of fluid from the clutch release chamber 6 to the vent 4 to be restricted, thus permitting the build up of pressure in 6 due to the pressure coming in through orifice F. This reduces the effective apply force in chamber C1 behind piston C, causing more slipping of the clutch, and permitting member A to regain its speed. Vent 4 is shown as leading to the clutch plates for cooling thereof, although vent 4 could dump elsewhere.

Figure 14:
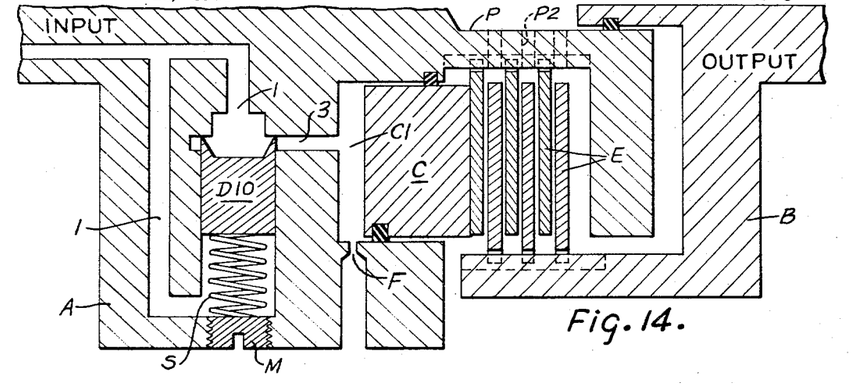
FIGURE 14 is a device similar to that shown in FIGURE 2 but utilizing a spring to provide a set speed valve arrangement.

FIGURE 14

Figure 15:
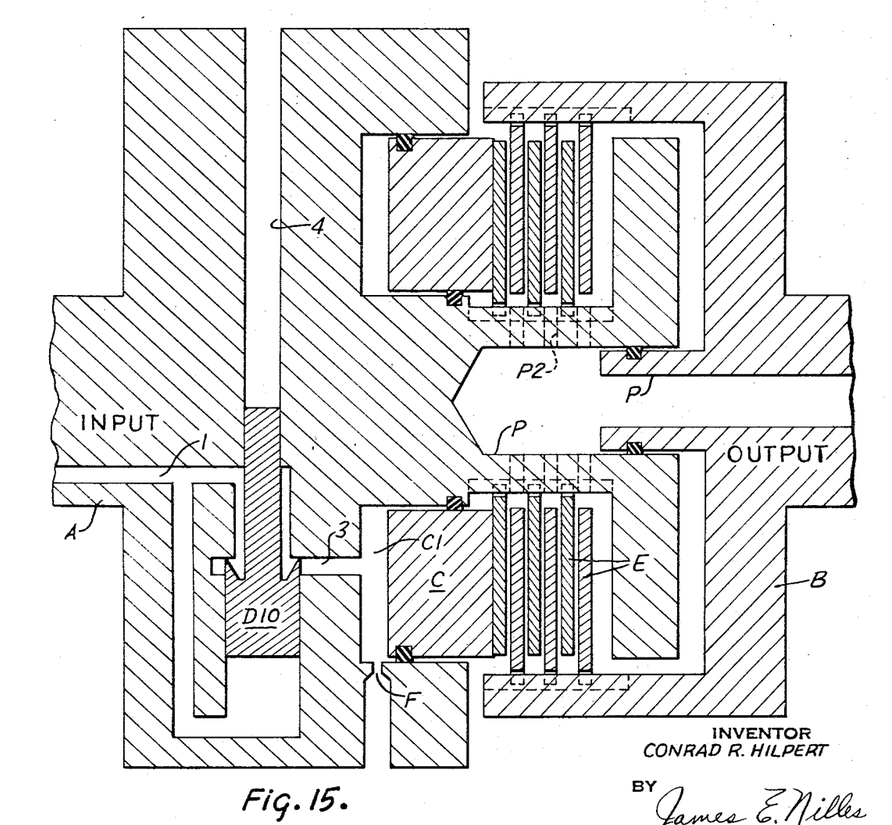
FIGURE 15 is a longitudinal cross sectional view of a clutch mechanism embodying the present invention and being an "inversion" of the FIGURE 6 device.

The FIGURE 14 device is similar to the device of FIGURE 15 except a spring S is used to provide a single, set speed valve arrangement which will increase or decrease the engagement of the clutch as the speed of input member A varies. There is thus provided a single, fixed speed or defined by the force of spring S and centrifugal force of valve D10.

Inward movement of valve D10 decreases engagement of the clutch, outward movement increases clutch engagement. The balancing speed can be set by screw plug M which will change the force of the spring.

FIGURE 15

FIGURE 15 shows an inversion of the FIGURE 6 device and is arranged so that decreasing speeds of the input member A causes a reduction in the engagement of the clutch and this "balancing speed" is adjustable by means of the pressure in passage 1. Passage 4 is merely a vent. Thus the speed of the input member A is controlled here by the external manual valve MV of FIGURE 9.

Figure 16:
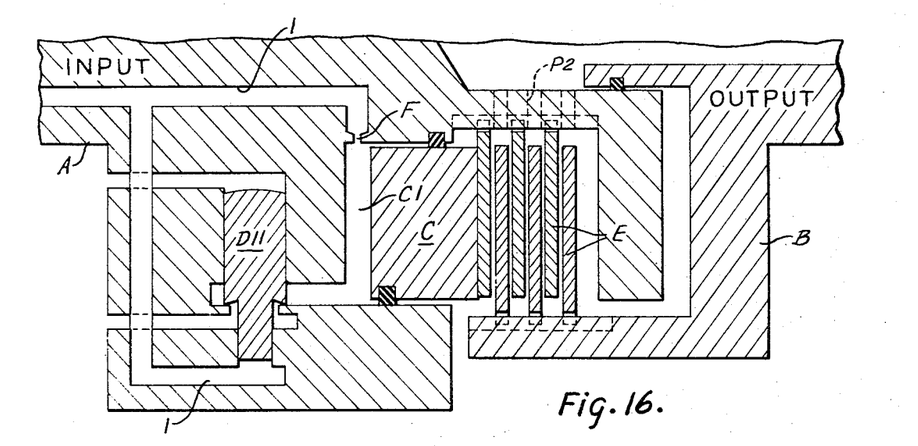
FIGURES 16–19 are views similar to FIGURE 15 but each being a modification thereof.

FIGURE 16

In FIGURE 2 it will be noted that it is the output member A that is controlled and the orifice F serves to vent the clutch chamber C1. Here in FIGURE 16 it is the input member A which is controlled as to speed, and the orifice F permits continual filling of the clutch.

FIGURE 16 is of the inversion type from FIGURE 15 and has the orifice F through which the control pressure in passage 1 is applied to the chamber C1, thus continually filling clutch chamber C1. The control valve D11 then controls the outflow from the chamber C1 as in the other inversion arrangement. In FIGURE 16 the action is such that as the speed called for by pressure in passage 1 is exceeded by the input member A, the friction clutch is increasingly engaged and as the speed of member A decreases, the engagement is reduced.

Here again, as previously mentioned, if the compensating pins of the "tail" feature for valve D11 is desired, they could be incorporated as necessary.

Figure 17:
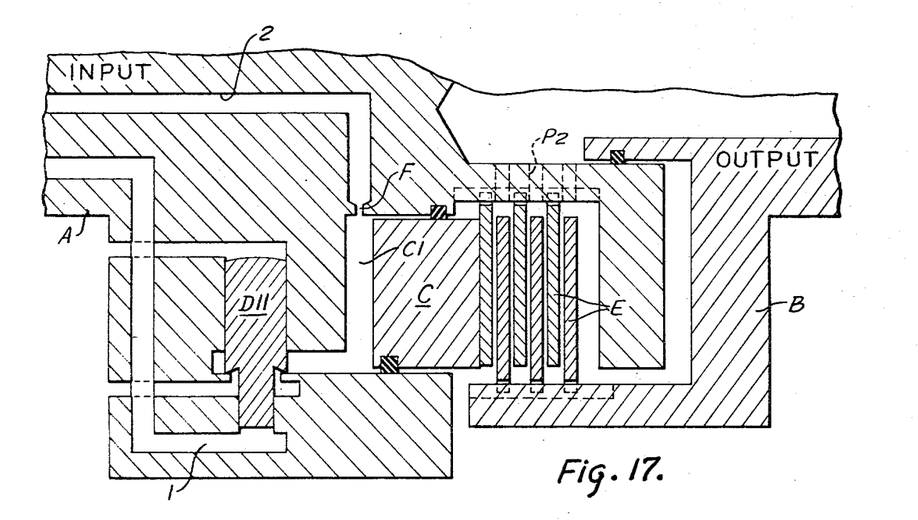

FIGURE 17

Figure 8:
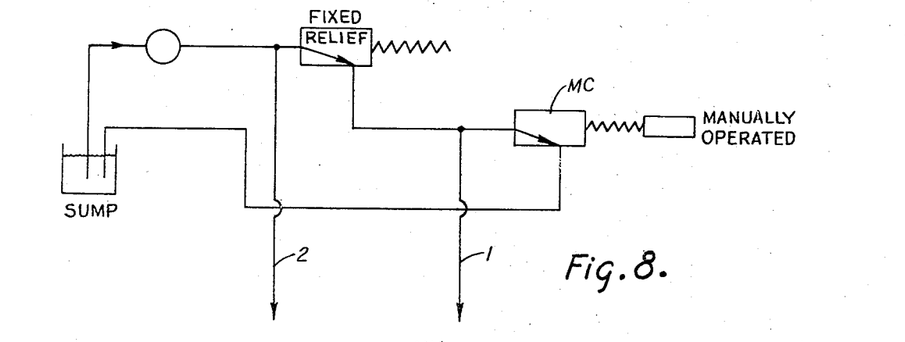
FIGURES 8 and 9 are schematic, hydraulic circuits which may be used with the present invention.

FIGURE 17 is a modification of FIGURE 16 and is controlled by the circuit shown in FIGURE 8. The device of FIGURE 17 allows the clutch apply pressure in passage 2 to be available as an independent source from the clutch control pressure in passage 1.

Figure 18:
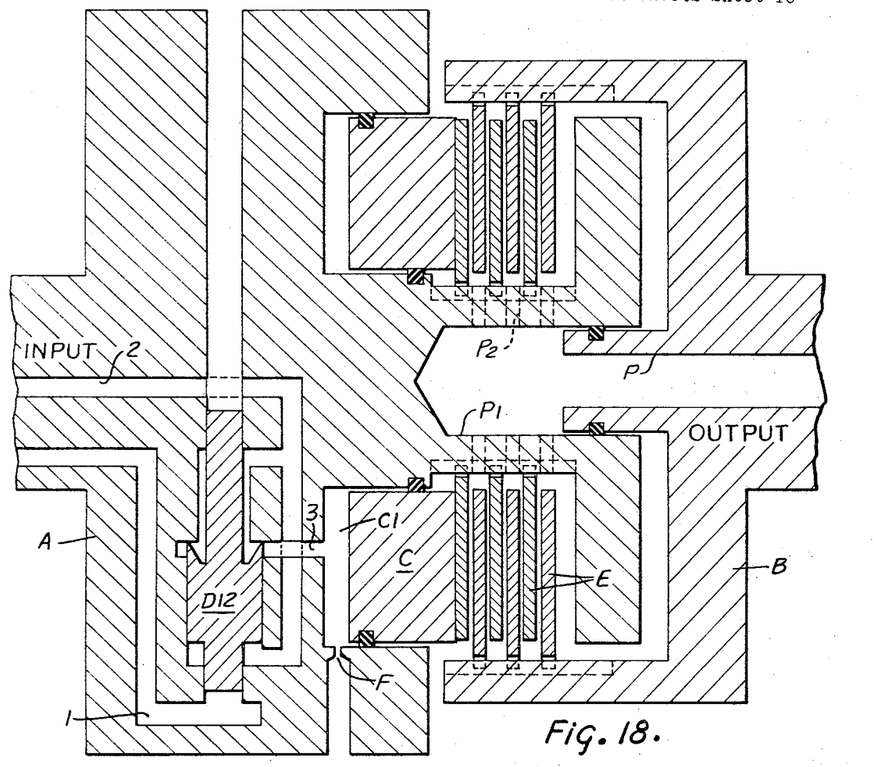

FIGURE 18

FIGURE 18 is a modification of FIGURE 15, also for the purpose of allowing the clutch apply pressure in passage 2 to be available independently of the clutch control pressure in passage 1. The device of FIGURE 18 would be controlled by the circuit of FIGURE 8.

Figure 19:
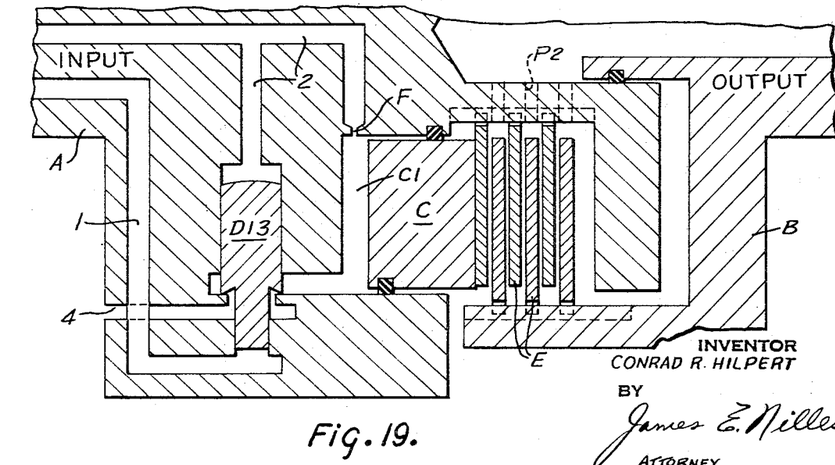

FIGURE 19

FIGURE 19 is a modification of FIGURE 16 and is provided so that the apply pressure in passage 2 can be independent of the control pressure in passage 1. This device is controlled by the circuit of FIGURE 9.

Figure 20:
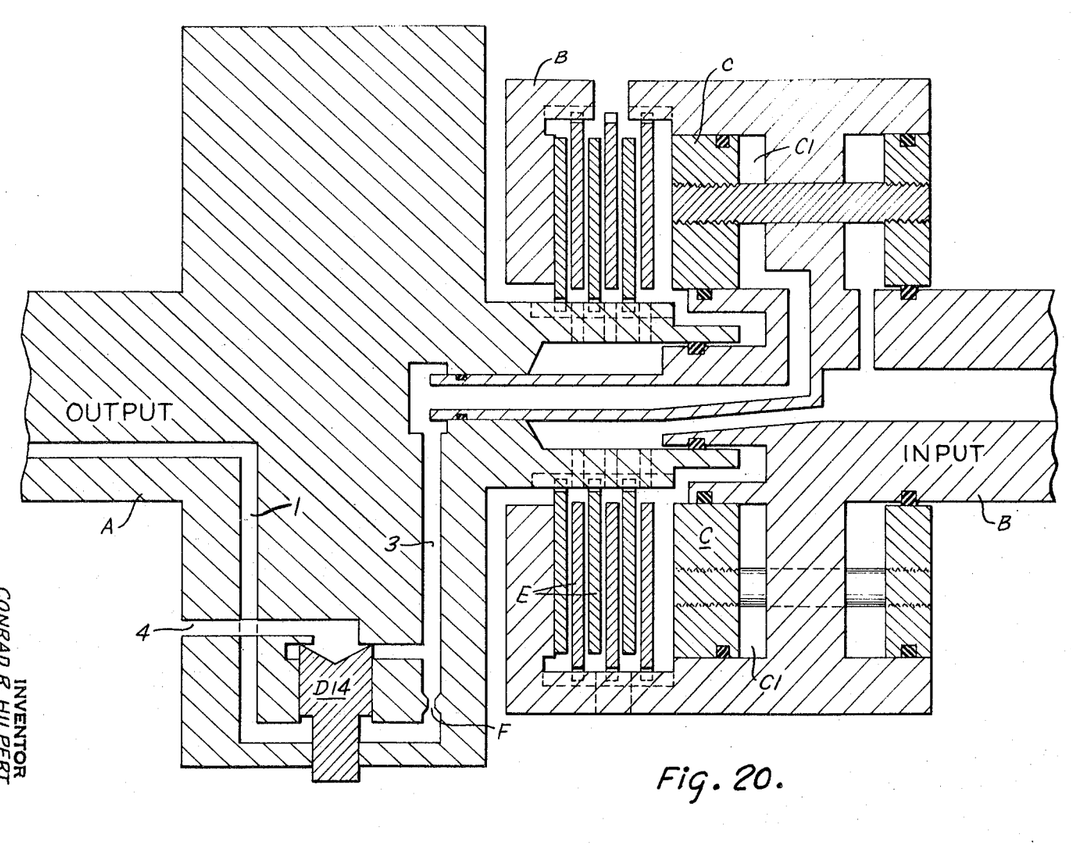
FIGURE 20 is a longitudinal, cross sectional view of a clutch mechanism embodying the present invention and being a modification of the other views.

FIGURE 20

Here the centrifugal valve is similar to the FIGURE 6 arrangement and is located in member A, the output member. The piston C, however, is located in the member B, the input member. This is called a divided or split design wherein the centrifugal valve D14 is located in one member and the piston is located in the other. This divided design could be used in the other modifications of the invention.

Résumé

By means of the present invention a clutch mechanism is provided which utilizes a centrifugally operated valve that is located on a member whose rotational speed it is desired to control. Control of the clutch mechanism is accomplished by externally operated pressure fluid, to provide a continuously slipping condition in the clutch, regardless of variations in coefficient of friction of the clutch or variations of load on one of the members.

A single control pressure can be utilized or, alternatively, a control pressure and a separate apply pressure for actuating the clutch can be used.

The centrifugal valve is capable of providing a constant output speed or, alternatively, providing for unloading or varying the apply pressure on the clutch to maintain a constant speed of the input member.

Furthermore, the control valve mechanism can be made either to control the input to the clutch actuating chamber or control the outflow of the continuously fed piston actuating chamber. In either event the mechanism controls the apply pressure on the clutch piston for causing slipping engagement of the clutch.

Various modes of carrying out the invention are contemplated as being within the scope of the following claims particularly pointing out and distinctly claiming the subject matter which is regarded as the invention:

What is claimed is:

1. Centrifugally controlled, friction clutch mechanism comprising; a rotatable driving member and a rotatable driven member; slippingly engagable friction clutch means between said members for establishing a slippable drive connection therebetween; hydraulically operated means for causing variable engagement of said friction clutch means; pressure fluid, centrifugally operated, control valve means in one of said members and responsive to speed changes thereof; compensating pin means located at the radially inner end of said centrifugally operated control valve means and bearing against the latter for compensating for the change of centrifugal force acting on the latter due to the change of radial location thereof, externally actuated, fluid pressure control means for supplying pressure fluid to said centrifugally operated control valve means for control thereof, and passage means placing said centrifugally operated control valve means in operative communication with said hydraulically operated means to cause variable actuation of the latter and consequent continuously controlled, slipping engagement of said friction clutch means in accordance with the rotation speed of said one of said members.

2. Mechanism as defined in claim 1 including a separate supply passage for supplying clutch apply fluid pressure to said hydraulically operated means independently of said externally actuated control means.

3. Mechanism as defined in claim 1 wherein said centrifugally operated control valve is located on the output member to maintain the rotational speed of said output member constant.

4. Mechanism as defined in claim 1 further characterized in that said centrifugally operated control valve is located on the power input member of the mechanism to cause variation of pressure on the clutch to cause the latter to slip and vary the load on the output member thereby maintaining constant speed of the input member.

5. Mechanism as defined in claim 1 wherein the centrifugally operated control valve means is located to control the fluid pressure input to the hydraulically operated means.

6. Mechanism as defined in claim 1 wherein the centrifugally operated control valve means is located to control the outflow from the hydraulically operated means.

7. A method of controlling the rotational speed of one member of a friction clutch having hydraulically actuated means for control thereof, and also having centrifugally operated valve means in said one member for controlling pressure fluid to said hydraulically actuated means, said method comprising, applying and controlling fluid pressure from an outside source to said hydraulically actuated means as determined by said centrifugally operated valve means in such a manner so as to cause continuous slipping engagement of said friction clutch in accordance with fluid pressure available to said hydraulically actuated means as permitted by said centrifugally operated valve means, to thereby maintain the rotational speed of said one member constant, and applying mass which is separately movable from said valve means and which is in abutting relationship with said valve means to dampen the movement of the latter.

References Cited
UNITED STATES PATENTS

| | | | |
|---|---|---|---|
| 1,106,242 | 9/1914 | Robey | 192—104 |
| 2,163,203 | 6/1939 | Kegresse. | |
| 2,297,480 | 9/1942 | Kratzmann | 192—104 X |
| 2,328,092 | 9/1943 | Nutt et al. | 192—103 X |
| 2,775,910 | 1/1957 | Wilkerson | 192—103 X |
| 2,822,901 | 2/1958 | Forster | 192—85 |
| 3,005,529 | 10/1961 | Bochan. | |
| 3,094,203 | 6/1963 | Jania et al. | 192—106 X |
| 3,166,165 | 1/1965 | Anderson et al. | 192—105 X |

FOREIGN PATENTS

| | | |
|---|---|---|
| 402,912 | 9/1924 | Germany. |

BENJAMIN W. WYCHE III, *Primary Examiner.*